July 18, 1961
A. S. BELCOVE ET AL
2,992,974
BIOLOGICAL TESTING DEVICE
Filed April 4, 1960
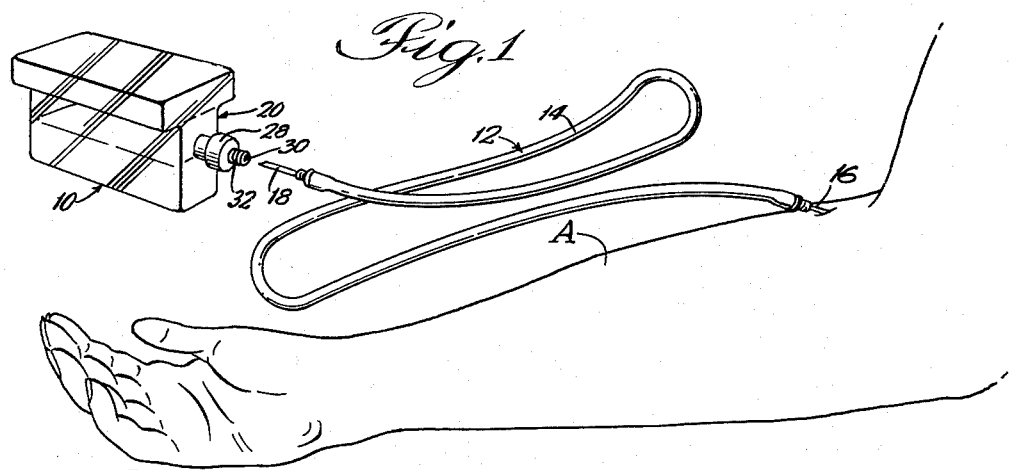
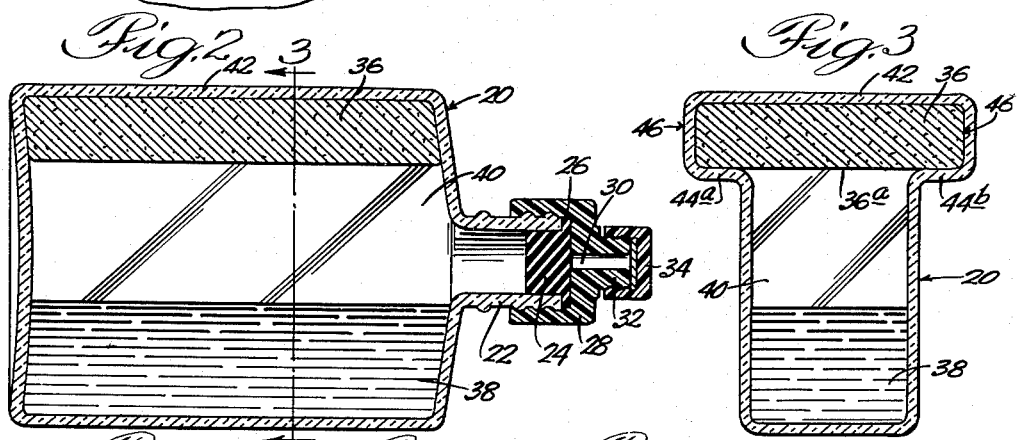
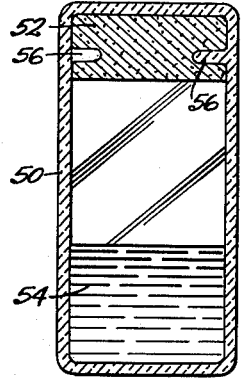
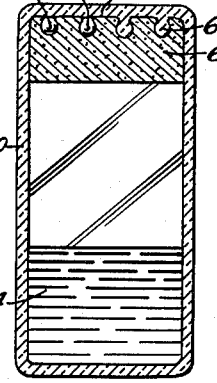
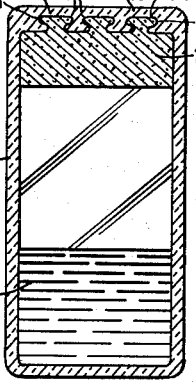
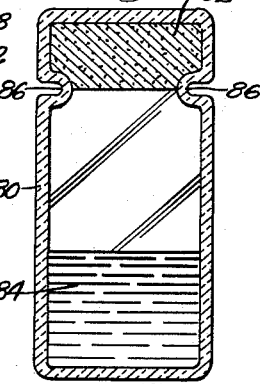
INVENTORS:
Allan S. Belcove
and Seymour Santow,
BY Bair, Freeman & Molinare
ATTORNEYS.

United States Patent Office 2,992,974
Patented July 18, 1961

1

2,992,974
BIOLOGICAL TESTING DEVICE
Allan S. Belcove, 6156 N. Hamilton St., and Seymour Santow, 5834 N. Campbell Ave., both of Chicago 45, Ill.
Filed Apr. 4, 1960, Ser. No. 19,658
10 Claims. (Cl. 195—139)

This invention relates to a biological testing device and more particularly to an improvement in an agar-slant type biological testing container.

In certain biological tests a substance to be tested is introduced into a sealed container having therein a nutrient upon which bacteria from the substance to be tested may be nourished so as to stimulate growth of colonies of such bacteria so that the nature of the bacteria may be further studied and perhaps tested. In recent years an improved testing device has become available wherein two different nutrients are provided in a single container into which is introduced the substance to be tested. The said improved device generally provides one nutrient in broth form and the second nutrient embodied in a gelatinous agar-layer that adheres to one wall of the container. By selectively positioning the container, the gelatinous agar-layer is disposed uppermost so that it is spaced apart and above the broth in the lowermost portion of the container, thereby insuring separation of the two nutrient media in which the bacteria colonies are to be nurtured.

One important problem incident to use of such a testing device lies in insuring that the nutrient-containing agar layer will remain adhered to the wall of the container because said agar layer, being spaced above the broth layer, is subjected to gravity forces which tend to pull the agar layer away from the wall against which it adheres. The solving of this problem requires great care in the production of the test device and requires greater expense in the preparation of the agar layer and in preliminary testing of the device than would normally be exercised in an economic assembly procedure.

Thus, one object of this invention is to provide an improved testing device of the type disclosed wherein the expenses of preparation of the agar layer and preliminary testing of the device are materially reduced because of increased assurance of retention of the nutrient-containing agar layer against the surface of the test container.

The use of bleeding sets to introduce blood specimens into testing containers under the influence of a suction from within the testing container has had great impetus in recent years. However, heretofore it has been impossible to utilize such suction actuated bleeding sets with an agar-layer type testing container, because not only was it difficult to insure retention of the agar-layer in place in the test container under atmospheric pressure, but the presence of a partial vacuum within the test container practically insured that the agar-layer would pull away from the container's wall.

Thus, it is another object of this invention to provide an improved testing device of the type including therein an agar-layer and wherein a partial vacuum is maintained in the device to permit use of a vacuum-actuated bleeding set to introduce a specimen to be tested into the testing device.

A further object of this invention is to provide a testing device having therein a nutrient broth, a nutrient-containing gelatinous layer, a partial vacuum for use in introducing a specimen to be tested into the device, and means to prevent the gelatinous layer from pulling away from its normal position in the device under the influence of the partial vacuum.

Further objects and advantages of this invention will become apparent as the following description proceeds

2 and the features of novelty which characterize this invention will be pointed out with particularity in the claims annexed to and forming part of this specification.

A preferred embodiment of the invention is shown in the accompanying drawings, in which:

FIGURE 1 is a perspective view showing the use of the testing device of this invention with a bleeding set for introducing a specimen to be tested into the testing device;

FIGURE 2 is a vertical axial cross-section view of the test container shown in FIGURE 1;

FIGURE 3 is a cross-section view taken on line 3—3 of FIGURE 2; and

FIGURES 4–7 are each similar to the view shown in FIGURE 3 and each illustrates a different modified form of construction for achieving the desired results obtained by the device of FIGURES 1–3.

Referring now to the drawings, there is shown in FIGURE 1 a testing device generally indicated at 10, which embodies therein features of novelty disclosed in this application. Also shown in FIGURE 1 is a bleeding set, generally indicated at 12, which is particularly adapted for use with the improved testing device 10.

The bleeding set 12 comprises an elongated, flexible tube 14, which is generally of a transparent nature, having attached at one end thereof a first, tubular, sharpened needle 16, and a second tubular sharpened needle 18. FIGURE 1 illustrates the use of the bleeding set and shows the first needle 16 inserted into the arm A of a person, preferably into a vein, and FIGURE 1 also illustrates the second needle 18 just preparatory to its being brought into cooperative relation with the testing device 10. It will be understood that with the arrangement that is shown in FIGURE 1, when the second needle 18 of the bleeding set is subjected to a reduced pressure, or suction, then a specimen of blood which is to be tested will be drawn from the body of the person through the bleeding set to the desired testing region. The bleeding set 12 and its use are well known in the art and no further description is needed at this point.

Referring now to the improved testing device 10, a preferred embodiment is shown in FIGURES 2 and 3. The preferred embodiment comprises a container 20, which is preferably formed of glass or other transparent material. The container 20 is generally provided with flat sides, as shown, and has a reduced threaded neck 22. Mounted in the terminal end of neck 22 is a pierceable rubber plug, or cap, 24, the body of which is press fit into the neck 22 for sealing engagement therewith. The plug 24 also has a lip portion 26 which engages the terminus of neck 22. An annular cap member 28, formed of plastic or the like, is threaded onto neck 22 and is shaped to define a central bore 30 therethrough and a reduced outwardly extending annular stud 32. The stud 32 is threaded to receive a sealing cap 34 which is formed of any appropriate material, such as plastic or the like.

In the use of the testing device 10 with the bleeding set 12, the sealing cap 34 may be removed and the needle 18 is inserted through the bore 30 so that the sharpened needle 18 may be pushed axially through the rubber plug 24, so that the terminal end of the needle 18 is exposed to the interior of the container 20. The presence of gases at less-than-atmospheric pressure within the container 20 will draw blood from the person through the bleeding set 12 and into the interior of the container 20. After the desired amount of specimen to be tested has been introduced into the container 20, the needle 18 is withdrawn and the plug 24 seals itself and thereby seals the container.

Now, within the container 20 there is provided a layer of congealed nutrient material indicated at 36. More specifically, a nutrient material is mixed with an agar solution in a heated, liquid state and, after being introduced into the container 20, the nutrient-containing agar solution congeals at room temperatures into a gelatinous-like layer. When such a nutrient-containing agar layer is disposed within container 20, as shown herein, the nutrient-containing layer is referred to as an "agar-slant."

In addition to the agar-slant layer 36, there is provided, within container 20, a predetermined quantity of a liquid broth 38 containing nutrient materials therein. When the container 20 is positioned as shown in FIGURES 2 and 3 the nutrient broth 38 occupies the lower portion of the container and the agar-slant 36 is then positioned along the upper side of the container 20 in spaced relation above the nutrient broth 38. The space 40 between the agar-slant 36 and the broth 38 is occupied by air, or a gas, or a combination of such gases at reduced pressure. In some instances of testing it is desired that the space 40 be filled with ordinary air at reduced pressure to provide the necessary vacuum to draw the blood through the bleeding set 12 into the container 20. In other instances the gas is preferably a combination of air with either nitrogen or carbon dioxide, or any combination of two or more of said gases. When the testing is intended to be done under anaerobic testing conditions, the air is completely evacuated and is supplanted by either nitrogen or carbon dioxide, or a combination of those gases, or by either of those gases in combination with another gas whose presence is desired for some particular testing.

Now, it will be understood that the agar-slant layer 36 being a solidified nutrient-containing layer, is, during testing conditions, maintained on the top side of the container 20, while the presence of gas in space 40, at a pressure reduced below atmospheric pressure, imposes certain forces on the agar-slant layer 36, which tends to separate the agar-slant layer from the adjacent walls of the container 20. Since it is desirable to observe the growth of bacteria both on or adjacent the agar-slant layer and in or adjacent the broth 38, if the agar-slant layer 36 should be pulled away from the wall of the container 20, the value of the test would probably be destroyed. Accordingly, it is the purpose of the invention herein to provide means for retaining the agar-slant layer 36 against the upper wall of container 20, as viewed in FIGURES 2 and 3, against the forces, including gravity, which tend to pull the agar-slant layer 36 downwardly. It is, accordingly, proposed by this invention to provide interstice means on and within the container 20 which provides means for effecting a gripping cooperation with the agar-slant layer 36 to hold the agar-slant layer against the walls of the container, to prevent the layer from pulling away from the walls of the container. These interstice means provide a plurality of contact surfaces on the walls of the container 20 which are adapted to be engaged by the agar-slant layer, and said contact surfaces are located in a plurality of different planes, so that portions of the agar layer will be disposed between pairs of opposed surfaces on the interior of the container, so as to provide supports which tend to retain the agar layer in the desired position on the interior of the container.

More specifically, in FIGURES 2 and 3, the container is shown to be T-shaped, so as to provide a first wall 42 of relatively large width which is located along the side of the container that defines the upper boundary of the T, and it is against this wall that the agar-slant layer 36 is desired to be retained. The container 20 also provides second wall means of lesser width relative to wall 42, segments of which second wall means are shown at 44a and 44b which bound the lower side of the top bar of the T and which are spaced in substantially parallel relation to the wall 42, and the spacing of these wall segments defines relatively narrow recesses indicated at 46 into which portions of the agar-slant layer 36 enter. The arrangement is such that the lower walls 44a and 44b provide supports which oppose the agar layer 36 pulling downwardly away from wall 42. The walls 44a and 44b are spaced apart to expose the lower surface segment 36a of layer 36, upon which the bacterial growths may be observed.

In the production of the device shown in FIGURES 2 and 3, heated nutrient-containing agar is introduced into a suitably sterilized container 20 when the container is inverted so that it is resting on its side 42. The liquid agar will immediately fill the space between wall 42 and the walls 44a and 44b. Sufficient liquid agar should be introduced to completely fill the space between said walls and, in this regard, the bottle may be filled so that a portion of the agar layer extends into the stem T of container 20. When the agar layer has cooled it solidifies, or congeals, to the condition seen in FIGURES 2 and 3, after which the nutrient broth 38 may be introduced into the container, and thereafter the air remaining in the container may be appropriately treated either to reduce its pressure or to evacuate it and introduce other gases at pressures below atmospheric pressure, after which the entire container is sealed by plug 24, while maintaining the interior of container 20 suitably sterilized.

With regard to the modified forms, in the device seen in FIGURE 4, the container is indicated at 50, the agar-slant is indicated at 52, and the liquid broth is indicated at 54. In FIGURE 4, the container has a generally rectangular exterior configuration. The upright walls of the container carry thereon a pair of ribs 56 which are closely spaced from the top wall of container 50 and which run axially of the container, and which cooperate with the top wall of the container to define interstice means which provides the necessary retentive engagement between the ribs 56 and the agar-slant 52.

In FIGURE 5, the rectangular container 60 includes agar-slant 62 and liquid broth 64, and the upper wall of the container 65 is pebbled or formed with globules or beads 66 projecting inwardly from the wall, and with the largest portions of the beads spaced from the wall 65 so as to define interstice means which provides gripping engagement with the agar-slant layer 62.

In FIGURE 6, the rectangular container 70 has an agar-slant layer 72 and liquid broth 74, and the upper wall 75 of the container is provided with axially extending undercut grooves 76 which define overlay lateral recesses 78, thereby providing interstice means into which the agar will flow when liquid, and when the agar-slant layer is solidified there is provided interstice means which engage and retain the layer 72 against the wall of the container.

In FIGURE 7, the container 80 contains an agar-slant layer 82 and liquid broth 84, and there are provided, in the upright walls of the container, indented, or dimpled, portions 86 which extend axially of the container. The axially extending dimpled portions may either be continuous or intermittent, but sufficient of such dimpled portions are provided to cooperate with the agar-slant layer 82 to retain the layer against the walls of the container.

It will be noted that while certain of the figures show planar surfaces which cooperate with the agar-slant layer to retain same in the desired position, there are other forms, notably those in FIGURES 5, 6 and 7, which provide non-planar gripping means which provide good gripping cooperation with the agar-slant layer.

While there has been shown and described a particular embodiment of this invention, it will be obvious to those skilled in the art that various changes and modifications may be made therein without departing from the invention and, therefore, it is intended in the appended claims to cover all such changes and modifications as fall within the true spirit and scope of the invention.

What we claim as new, and desire to secure by Letters Patent of the United States, is:

1. In an agar-slant-type biological testing container, the improvement comprising, in combination, an enclosed container with an agar-slant layer along one wall thereof, an amount of liquid nutrient broth in the container, and a gas space in said container, a gas in the container at a pressure reduced below atmospheric pressure, and layer-engaging means defined on the inner walls of said container cooperating with said agar-slant layer to increase the forces tending to retain the agar-slant layer against said one wall of the container, for keeping the agar-slant layer against said wall of the container against the forces, including the reduced gas pressure within the container, which tend to separate the agar-slant layer from the walls of the container.

2. A biological testing device comprising, in combination, an enclosed transparent container, a layer of congealed nutrient material in said container, an amount of liquid nutrient broth in the container, and a gas space in said container, a gas in said container at a pressure below atmospheric pressure, thereby creating a partial vacuum in said container, a pierceable cap sealing the container, and layer-engaging means for retaining said congealed layer against an inner wall of the container in the presence of said less-than-atmospheric gas pressure in said container.

3. A biological testing device comprising, in combination, an enclosed transparent container, a congealed layer including nutrient materials disposed in said container, an amount of liquid nutrient broth in the container, and a gas space in said container, and interstice means defined on said container for receiving thereinto portions of said congealed layer to effect gripping cooperation with said layer to hold same against the walls of the container to prevent said layer from pulling away from the walls of the container.

4. A biological testing device comprising, in combination, an enclosed transparent container, a congealed layer including nutrient materials disposed against at least one wall of said container, an amount of liquid nutrient broth in the container, and a gas space in said container, and non-planar layer-gripping means defined in said container for engaging portions of said congealed layer to effect gripping cooperation with said layer to hold same against the walls of the container to prevent said layer from pulling away from the walls of the container.

5. A biological testing device comprising, in combination, an enclosed transparent container, a congealed agar layer including nutrient materials disposed in said container, an amount of liquid nutrient broth in the container, and a gas space in said container, and interstice means on said container for gripping cooperation with said layer to hold same against the walls of the container to prevent said layer from pulling away from the walls of the container, said interstice means including a plurality of contact surfaces provided on the walls of said container adapted to be engaged by the agar layer and located in different planes, so that portions of the agar layer are disposed between opposed contact surfaces on the interior of the container to increase the forces tending to retain the agar layer in position on the interior of the container.

6. An improved enclosed container for biological testing comprising, in combination, means defining a first wall of relatively large width in said container against which a layer of material in liquid form is adapted to be disposed to be later congealed, second wall means in said container of small width relative to the width of said first wall and spaced opposite of portions of said first wall to define relatively narrow recesses between said spaced walls into which may enter a portion of the material to be congealed, so that means are thereby provided for increasing retention of a congealed layer of the material against said first wall, and a congealed layer including nutrient materials in said container located between said first wall and said second wall means.

7. A device as set forth in claim 6 including a gas in said enclosed container at a pressure reduced below atmospheric pressure.

8. A device as set forth in claim 6 including a gas in said enclosed container at a pressure reduced below atmospheric pressure, and wherein said gas includes at least one gas from the group consisting of air, carbon dioxide, and nitrogen.

9. A device as set forth in claim 6 including a plurality of spaced bead-like elements projecting inwardly from the wall of the container against which the layer of nutrient material is located, so that said bead-like elements project into said layer and increase retention of the layer against the said container wall.

10. A device as set forth in claim 6 wherein the cross-section of the container interior is T-shaped and the layer of nutrient material is located along the side of the container defining the upper boundary of the T, so that the container walls bounding the lower side of the top bar of the T operate to retain the solidified layer of nutrient material in position, while exposing the remainder of the layer of nutrient material to materials which may be introduced into the container.

References Cited in the file of this patent
UNITED STATES PATENTS

| | | |
|---|---|---|
| 1,584,903 | Supplee | May 18, 1926 |
| 2,348,448 | Brewer | May 9, 1944 |
| 2,660,171 | Dickinson | Nov. 24, 1953 |
| 2,878,808 | Broman | Mar. 24, 1959 |

OTHER REFERENCES

"A Divided Culture Plate" by Felsen, J., Am. J. Clin. Path., March 1944, vol. 19, No. 3, pp. 289–290.